June 1, 1937.   O. P. McCARTY   2,082,645
TRANSFORMER CONNECTION
Filed Jan. 6, 1937
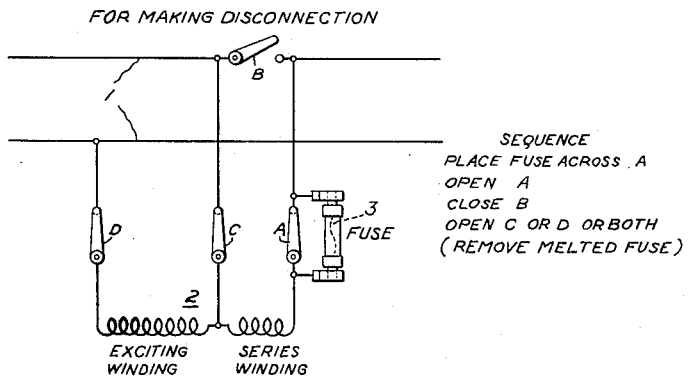
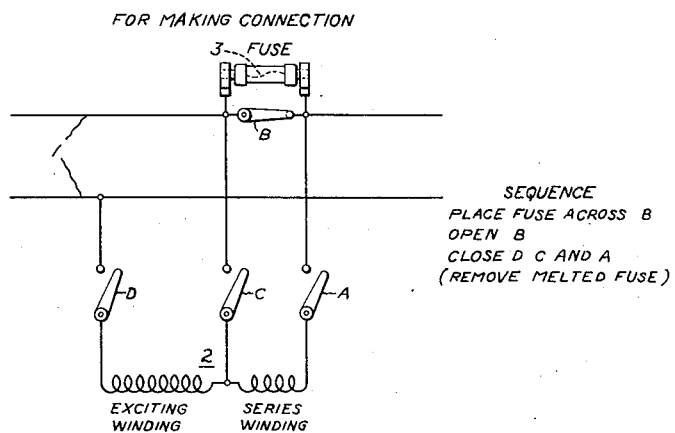
Inventor:
Orin P. McCarty,
by Harry E. Dunham
His Attorney.

Patented June 1, 1937

2,082,645

UNITED STATES PATENT OFFICE 2,082,645

TRANSFORMER CONNECTION

Orin P. McCarty, Pittsfield, Mass., assignor to General Electric Company, a corporation of New York Application January 6, 1937, Serial No. 119,235

5 Claims. (Cl. 171—97)

My invention relates to transformer connections and more particularly to a method of and apparatus for making and breaking connections between a transformer, particularly an autotransformer, and an alternating current circuit without interrupting the current in the circuit.

When a transformer is connected in a circuit, it is ordinarily impossible safely to disconnect it from the circuit without momentarily opening the circuit and interrupting the current therein and likewise once the transformer has been disconnected it is similarly impossible safely to reconnect it to the circuit without momentarily interrupting the circuit. In the case of disconnection of an autotransformer, this is because its series winding obviously cannot be directly disconnected from the circuit without interrupting the circuit, and if the series winding is bridged by a jumper or other low resistance path the resulting short-circuit current will burn out the series winding. If its common or exciting winding is disconnected while the series winding is in circuit a relatively very high voltage will usually be induced therein in a manner similar to the high voltage induced in the secondary winding of a current transformer when the secondary winding circuit is opened. Obviously, the exciting winding cannot be short-circuited as this will short-circuit the entire power circuit. In the case of reconnection, similar difficulties are encountered.

Autotransformer type voltage regulators fail occasionally and also they require periodic inspection, cleaning and adjustment, thus necessitating momentary interruption of distribution feeder circuits in which they are connected in order that they may be disconnected from the circuit and after they have been repaired be reconnected thereto. However, from an operating standpoint, this is very undesirable as it causes interruptions in the continuity of electrical service. This, therefore, has given rise to a considerable problem in the past.

In accordance with my invention, I provide a novel, simple, and inexpensive method of and apparatus for disconnecting a transformer from a circuit and reconnecting it thereto without the necessity of interrupting the current flow in the circuit. In general, this is characterized by the use of a fuse which is capable of carrying the load current of the circuit but is incapable of carrying the short-circuit current of the transformer. By short-circuiting the transformer by means of such a fuse, which fuse has previously been properly connected in the circuit, the blowing of the fuse as a result of the short-circuit current flowing therein not only protects the transformer and limits the short-circuit current to a safe value but also so changes the circuit relationship between the series winding and the circuit as automatically to make the proper connection or disconnection between the winding and the circuit.

By the term "fuse" I wish to be understood as including any and all equivalent forms of overcurrent actuated circuit interrupters, such as automatic circuit breakers, film cutouts, fuse cutouts, overload contactors, etc.

While my invention is particularly adapted for use with autotransformer type regulators, it may also be used with transformers generally.

An object of my invention is to provide a new and improved method and apparatus of transformer disconnection from and reconnection to an alternating current circuit without interrupting the circuit.

My invention will be better understood from the following description taken in connection with the accompanying drawing and its scope will be pointed out in the appended claims.

In the drawing, Fig. 1 is an illustration of an application of my invention to disconnecting an autotransformer from a power circuit, and Fig. 2 illustrates diagrammatically an application of my invention for reconnecting the autotransformer to a power circuit without interrupting the circuit.

Referring now to the drawing and more particularly to Fig. 1, there is shown therein an alternating current circuit I in which is connected an autotransformer 2. This is done by means of connecting devices A, B, C, and D. These are shown diagrammatically as single pole, single throw manually operable switches, but it should be understood that they are shown this way merely as convenient symbols for means for selectively manually making and breaking connections. They might equally well stand for jumpers between lugs on a terminal board, or merely for the connections between a cable or conductor terminal and a stud on a terminal board. As shown, connections A, C, and D are closed, and B is opened so that a voltage corresponding to the voltage of a series winding is inserted in series in the upper conductor of the circuit I and the main circuit current flows through the series winding. In addition to the above, all that is required for the practicing of my invention is a fuse 3 which is capable of carrying the load current in circuit I, but which will melt or blow when being subjected to the short circuit current of the autotransformer 2.

The sequence of operation in disconnecting the autotransformer 2 from circuit 1 in Fig. 1 is as follows:

The fuse 3 is placed across A and A is then opened, thus inserting the fuse in series with the series winding of the autotransformer. As the fuse can carry the circuit load current, circuit conditions are substantially unchanged. B is now closed, thus producing a short-circuit on the series winding through the fuse 3. This immediately blows the fuse 3, thereby automatically opening the circuit through the series winding, but as B is closed the current in the main circuit 1 is not interrupted. C or D is then opened, or both are opened, in order to complete the disconnection of the transformer. The melted fuse 3 may then be removed.

In connecting the autotransformer 2 to the circuit 1 or in reconnecting it thereto, the fuse 3 is placed across B when it is closed and B is then opened thereby inserting the fuse directly in the power circuit. D, C, and A are then closed, and as A closes, the series winding is short-circuited through the fuse 3 which immediately blows, thereby automatically inserting the series winding in the circuit 1 without interrupting the current therethrough. The melted fuse may then be removed.

While I have shown two ways of practicing my invention, it will be obvious to those skilled in the art that changes and modifications can be made, and I therefore aim in the appended claims to cover all such changes and modifications as fall within the true spirit and scope of my invention.

What I claim as new and desire to secure by Letters Patent of the United States is:

1. The method of changing the circuit relationship between a transformer and an alternating current circuit without interrupting the current in said circuit, which comprises connecting a current actuated circuit interrupter in said circuit, and short-circuiting said transformer through said interrupter while the exciting winding of said transformer is energized, said interrupter being capable of carrying the circuit load current but being incapable of carrying the transformer short-circuit current whereby when the transformer short-circuit current actuates said interrupter it automatically makes the desired change in circuit relationship between said transformer and said circuit.

2. The method of disconnecting an autotransformer from an alternating current circuit without interrupting the current in said circuit which comprises connecting a fuse which melts only on a current therethrough in excess of the load current in said circuit in series with the series winding of said transformer, short-circuiting said series winding and fuse in series, and disconnecting the transformer windings from said circuit.

3. The method of disconnecting an autotransformer from an alternating current load circuit without interrupting the current therein which comprises, connecting a fuse which melts only on a current therethrough in excess of the load current in said circuit in parallel with a portion of the conductor of said circuit which contains the series winding of said transformer, breaking the circuit through said portion of said conductor whereby the circuit current flows through said fuse, making a low resistance connection around said fuse and series winding thereby causing the transformer short-circuit current to melt said fuse, and disconnecting the windings of said transformer from said circuit.

4. The method of connecting an autotransformer in an alternating current circuit without interrupting the current in said circuit which comprises connecting in said circuit a fuse which blows only on a current therethrough in excess of the load current in said circuit, and connecting the windings of said autotransformer to said circuit with the series winding thereof connected across said fuse.

5. The method of connecting an autotransformer to an alternating current load circuit without interrupting the current in said circuit which comprises, connecting a fuse which melts only on a current therethrough in excess of the load current in said circuit in parallel with a portion of a conductor of said circuit, making a break in said portion of said conductor whereby the circuit load current flows through said fuse, and connecting the windings of said transformer to said circuit with the series winding thereof connected across said fuse whereby the transformer short-circuit current will melt said fuse thereby connecting said series winding in said circuit.

ORIN P. McCARTY.